US010422684B2

(12) United States Patent
Nilsson et al.

(10) Patent No.: US 10,422,684 B2
(45) Date of Patent: Sep. 24, 2019

(54) FIELD DEVICE WITH SECOND AUXILIARY INTERFACE

(71) Applicant: Rosemount Tank Radar AB, Mölnlycke (SE)

(72) Inventors: Leif Nilsson, Linköping (SE); Håkan Fredriksson, Linköping (SE); Håkan Nyberg, Linköping (SE)

(73) Assignee: ROSEMOUNT TANK RADAR AB, Göteborg (SE)

( * ) Notice: Subject to any disclaimer, the term of this patent is extended or adjusted under 35 U.S.C. 154(b) by 150 days.

(21) Appl. No.: 15/608,188

(22) Filed: May 30, 2017

(65) Prior Publication Data

US 2018/0348041 A1 Dec. 6, 2018

(51) Int. Cl.
*G01F 23/292* (2006.01)
*G01F 23/284* (2006.01)
*G01S 13/88* (2006.01)
*G01D 11/24* (2006.01)
*G01S 7/02* (2006.01)

(52) U.S. Cl.
CPC ....... *G01F 23/2927* (2013.01); *G01D 11/245* (2013.01); *G01F 23/284* (2013.01); *G01S 13/88* (2013.01); *G01S 2007/027* (2013.01)

(58) Field of Classification Search
None
See application file for complete search history.

(56) References Cited

U.S. PATENT DOCUMENTS

| | | |
|---|---|---|
| 5,764,891 A | 6/1998 | Warrior |
| 6,889,282 B2 | 5/2005 | Schollenberger |
| 6,904,476 B2 | 6/2005 | Hedtke |
| 7,262,693 B2 | 8/2007 | Karschnia et al. |
| 7,308,825 B2 | 12/2007 | Hagg et al. |
| 7,415,366 B2 * | 8/2008 | Florenz ............... G01D 3/02 702/50 |
| 7,773,715 B2 | 8/2010 | Westfield et al. |

(Continued)

OTHER PUBLICATIONS

Notification of Transmittal of the International Search Report and the Written Opinion of the International Searching Authority from PCT/EP2018/063982, dated Aug. 17, 2018.

*Primary Examiner* — Andre J Allen
(74) *Attorney, Agent, or Firm* — Westman, Champlin & Koehler, P.A.

(57) ABSTRACT

The present invention relates to a field device adapted to determine a process parameter value related to a tank, the field device comprising a terminal block with: a first interface configured to connect to two wires of a loop; a first electrical conductor and a second electrical conductor for connecting the first interface with field device electronics, the second electrical conductor having a voltage drop generating element; a first power supply conductor connected to said second electrical conductor upstream of the voltage drop generating element and a second power supply conductor connected to said second electrical conductor downstream of the voltage drop generating element; and a second, auxiliary interface adapted for wired connection to an external device and configured at least for communication with said external device, wherein the second auxiliary interface comprises a communications connector which is galvanically isolated from the field device electronics.

15 Claims, 5 Drawing Sheets

(56) References Cited

U.S. PATENT DOCUMENTS

| | | |
|---|---|---|
| 7,821,444 B2 | 10/2010 | Hall et al. |
| 8,150,462 B2 | 4/2012 | Guenter et al. |
| 8,762,745 B2 | 6/2014 | Seiler |
| 2003/0139146 A1 | 7/2003 | Mercier |
| 2004/0124854 A1 | 7/2004 | Slezak |
| 2004/0184517 A1 | 9/2004 | Westfield et al. |
| 2004/0203421 A1 | 10/2004 | Hedtke |
| 2006/0290328 A1 | 12/2006 | Orth |
| 2007/0055463 A1* | 3/2007 | Florenz .................... G01D 3/02 702/50 |
| 2008/0147336 A1 | 6/2008 | Karbula et al. |
| 2008/0174178 A1 | 7/2008 | Jakobsson et al. |
| 2009/0322593 A1 | 12/2009 | Hall et al. |
| 2010/0302008 A1 | 12/2010 | Engelstad et al. |
| 2011/0208440 A1 | 8/2011 | Pechstein et al. |
| 2012/0022672 A1* | 1/2012 | Ruf ......................... G01D 1/00 700/79 |
| 2015/0082907 A1* | 3/2015 | Hunter ..................... G01F 1/60 73/861.12 |
| 2015/0118914 A1* | 4/2015 | Simon ............... H01R 13/6616 439/709 |
| 2016/0313717 A1* | 10/2016 | Ruf .................... G05B 19/0428 |
| 2017/0012622 A1* | 1/2017 | Peter ...................... H02M 3/07 |
| 2017/0160121 A1* | 6/2017 | Florenz ................ G01F 23/244 |
| 2017/0229819 A1* | 8/2017 | Simon ............... H01R 13/6616 |
| 2018/0253072 A1* | 9/2018 | Seiler .................. G05B 19/042 |

* cited by examiner

FIELD DEVICE WITH SECOND AUXILIARY INTERFACE

FIELD OF THE INVENTION

The present invention relates to a field device adapted to determine a process parameter value related to a tank, such as filling level. The present invention also relates to tank gauging system i.a. comprising a field device. The present invention also relates to a terminal block for a field device. The present invention also relates to a method for connecting an external device to a field device.

BACKGROUND OF THE INVENTION

An existing field device adapted to determine a process parameter value related to a tank, such as Rosemount 5400 Radar Level Transmitter or Rosemount 5300 GWR Level Transmitter, comprises a terminal block with an interface configured to connect to two wires of a process control loop for power supply to and signal output from the field device.

There may however be a need to connect an external device to that type of field device. The external device may for example be a remote display. When connecting to an external device, complying with Ex (explosion protection) requirements and how to supply power to the external device may have to be considered.

U.S. Pat. No. 7,262,693 (Karschnia et al.) discloses a process controller monitoring system which includes a field device which connects to a control system through a process control loop through a junction box. Another field device couples to the process control loop and includes wireless communication circuitry. The wireless communication circuitry is configured to send an RF signal and to be completely powered by power received from the process control loop. The other field device includes a power regulator, a shunt or bypass, and a super capacitor. During operation, the super capacitor is slowly charged using a power regulator by using excess voltage tapped from the process control loop. The use of a capacitor allows quick charging and the storage of sufficiently large energy potentials. However, when used in a hazardous environment, large energy storage may not be accepted in order to meet intrinsic safety standards. In such a case, U.S. Pat. No. 7,262,693 teaches that the other field device is moved away from the hazardous environment, to the junction box where intrinsic safety is not required. Furthermore, the other field device reserves power even if the wireless communication circuitry is not used, which may impair the lift-off/update rate at all times.

SUMMARY OF THE INVENTION

It is an object of the present invention to provide an improved field device to which an external device can be connected, which field device may overcome or at least alleviate the aforementioned drawbacks.

According to a first aspect of the present invention, this and other objects are achieved by a field device adapted to determine a process parameter value related to a tank, the field device comprising: a housing having an opening closed by a removable cover; a terminal block located in the housing and accessible via said opening; and field device electronics located in the housing, wherein the terminal block comprises: a first interface configured to connect to two wires of a loop for power supply to and signal output from the field device; a first electrical conductor and a second electrical conductor for connecting the first interface with the field device electronics, the second electrical conductor having a voltage drop generating element; a first power supply conductor connected to said second electrical conductor upstream of the voltage drop generating element and a second power supply conductor connected to said second electrical conductor downstream of the voltage drop generating element; and a second, auxiliary interface adapted for wired connection to an external device and configured at least for communication with said external device, wherein the second auxiliary interface comprises a communications connector which is galvanically isolated from the field device electronics.

The 'field device electronics' may here be construed as the complete electronics required to determine the process parameter value, for example filling level.

The 'external device' is external to the field device. The external device may be an auxiliary device, in that it may support or be secondary to the main function of the field device.

The 'loop' may for example be a process control loop.

The present invention is based on the understanding that by means of the voltage drop generating element—such as at least one diode—and the first and second power supply conductors, power can be tapped from just one of the electrical conductors only when it is needed, without having to continuously reserving means to power for example the external device from within the field device. Furthermore, the power requirements of different units—for example the external device—powered by the tapped voltage may vary without affecting the field device. That is, the field device does not need to be designed to account for various power requirements imposed by different units, for example different external devices. This can instead be handled by the external device, e.g. by adjusting the update rate etc. Furthermore, since the communications connector is galvanically isolated from the field device electronics, high voltages in the field device electronics will not be transferred to the communications connector, which is beneficial for explosion protection.

In a first embodiment, the second auxiliary interface is further configured to power the external device by means of a lift-off voltage taken from the loop. 'Lift-off voltage' is the minimum voltage required to ensure proper operation of the external device, and the lift-off voltage corresponds to the voltage drop caused by the voltage drop generating element. This lift-off voltage comes in addition to the lift-off voltage required by the field device when no external device is connected. The second auxiliary interface may for example further comprise first and second power supply connectors, the first power supply connector being connected to said first power supply conductor and the second power supply connector being connected to said second power supply conductor. Hence in this embodiment, the second auxiliary interface comprises first and second power supply connectors as well as a communications connector. The external device connected to such a second auxiliary interface may for example be remote display or a pressure transducer. That is, the terminal block in this embodiment may be generic, in that different external devices can be connected to it. When no external device is connected to the second auxiliary interface, the power supply connectors of the second auxiliary interface may be short-circuited, for example by means of a jumper.

In case the loop is intrinsically safe, no internal isolated or non-isolated diode (shunt) safety barrier is required in order to facilitate an otherwise required associated intrinsically safe power output of the second auxiliary interface, since it is powered by power originating from the loop. On the other hand, the second auxiliary interface may be designed to always be ex-ia regardless of the loop input. To this end, the terminal block may further comprise an intrinsic safety barrier between the second electrical conductor and the power supply connectors of the second auxiliary interface. The intrinsic safety barrier may for example be an ex-ia barrier in the terminal block. Alternatively, the external device may comprise such a barrier, or the external device may have an explosion or flame proof housing.

In a second embodiment, the terminal block further comprises sensor electronics connected to the communications connector of the second auxiliary interface and to said first and second power supply conductors, wherein the sensor electronics are configured to determine an auxiliary process parameter value. In this embodiment, the tapped power is primarily used to power the sensor electronics, though the sensor electronics may in turn function as a current source for the external device (using said tapped power). Also in this embodiment, the 'communication' at the second auxiliary interface may for example be analog signals from the external device. If the (main) tank-related process parameter value is filling level, the auxiliary process parameter value could be temperature, and the external device connected to the second auxiliary interface of the second embodiment may for example be a resistance temperature detector (RTD). The sensor electronics may be adapted to convert signals from the external device (e.g. the RTD or some other passive device) connected to the communications connector of the second auxiliary interface to digital signals. The sensor electronics may for example be configured to convert temperature signals to digital SPI (serial peripheral interface) signals. The terminal block in this embodiment may be specifically designed for a particular external device.

The voltage drop generating element may comprise at least one diode, which conducts electrical current primarily in one direction. To this end, the aforementioned first power supply conductor may be connected at the anode side of the diode, whereas the second power supply conductor is connected at the cathode side of the diode. The diode may function as a shunt. The voltage drop of a single diode may be in the order to 0.7 V, but the voltage used by the external device or the sensor electronics may be higher. That is, provided that the voltage drop is high enough it can be stepped up by the external device or the sensor electronics. Instead of a single diode, the voltage drop generating element may comprise several diodes in series, to provide a greater voltage drop. Three semiconductor diodes connected in series may for example provide a total voltage drop of about 2 V.

The voltage drop generating element may be a configurable voltage drop generating element. In this way, different voltages can be tapped depending on the power requirement of different external devices, without having to step up the voltage drop. The configurable voltage drop generating element may for example comprise diodes connected in series, wherein each node between the diodes is available as an additional power supply connector (via additional power supply conductors). In this way, a desired total voltage drop may be selected by connecting a particular external device to the appropriate power supply connectors. Alternatively, the configurable voltage drop generating element could be a programmable shunt, like TL431 provided by Texas Instrument, for example.

The aforementioned housing may comprise a first compartment accommodating the terminal block, and a second compartment accommodating the field device electronics. The first compartment may be referred to as a terminal compartment or "dirty" compartment, whereas the second compartment may be referred to as a "clean" compartment. A barrier may separate the first and second compartments, such that only the first compartment is accessible via the aforementioned opening in the housing, whereas the second compartment accommodating the field device electronics is not accessible via the opening.

The field device may further comprise an opto-isolator connected between the communications connector and the field device electronics, for galvanically isolating the communications connector from the field device electronics. An opto-isolator is generally a component that transfers electrical signals between two isolated circuits by using light. The opto-isolator may comprise a light source on the terminal block and a photodetector in the second compartment, wherein the light source and the photodetector are interconnected by an optical fibre. In this way, a high enough maximum isolation voltage can easily be provided. Alternatively, the complete opto-isolator may be provided on the terminal block. In yet another alternative, the communications connector could be galvanically isolated from the field device electronics using a transformer on the terminal block, for example.

In an exemplary implementation, the present field device is a radar level gauge adapted to determine a filling level of a product contained in the tank, wherein the radar level gauge further comprises a propagation device, and wherein the field device electronics include: a transceiver connected to the propagation device and adapted to generate, transmit and receive electromagnetic signals (microwaves), wherein the propagation device is arranged to propagate a transmitted electromagnetic signal towards said product inside the tank, and to return a surface echo signal resulting from reflection of the transmitted electromagnetic signal at a surface of the product contained in the tank back to said transceiver; and processing circuitry connected to the transceiver and configured to determine said filling level based on said surface echo signal. The propagation device may comprise a radiating antenna or a transmission line probe.

According to a second aspect of the present invention, there is provided a tank gauging system, comprising: a field device adapted to determine a process parameter value related to a tank; a power supply; a process control loop comprising two wires connected to the power supply; and an external device, wherein the field device comprises a housing having an opening closed by a removable cover, a terminal block located in the housing and accessible via said opening, and field device electronics located in the housing, the terminal block comprising: a first interface to which least two wires are connected for power supply to and signal output from the field device; a first electrical conductor and a second electrical conductor for connecting the first interface with the field device electronics, the second electrical conductor having a voltage drop generating element; a first power supply conductor connected to said second electrical conductor upstream of the voltage drop generating element and a second power supply conductor connected to said second electrical conductor downstream of the voltage drop generating element; and a second, auxiliary interface to which the external device is connected, wherein the second auxiliary interface is configured at least for communication with said external device, and wherein the second auxiliary interface comprises a communications connector which is galvanically isolated from the field device electronics. This aspect may exhibit the same or similar feature and technical effects as the first aspect of the present invention, and vice versa.

According to a third aspect of the present invention, there is provided a terminal block for a field device adapted to determine a process parameter value related to a tank, wherein the terminal block comprises: a first interface configured to connect to two wires of a loop for power supply to and signal output from the field device; a first electrical conductor and a second electrical conductor for connecting the first interface to field device electronics of the field device, the second electrical conductor having a voltage drop generating element; a first power supply conductor connected to said second electrical conductor upstream of the voltage drop generating element and a second power supply conductor connected to said second electrical conductor downstream of the voltage drop generating element; a second, auxiliary interface adapted for wired connection to an external device and configured at least for communication with said external device, wherein the second auxiliary interface comprises a communications connector; and means adapted to galvanically isolate the communications connector from the field device electronics. This aspect may exhibit the same or similar feature and technical effects as the first and/or second aspect of the present invention, and vice versa. Said means may for example comprise the aforementioned opto-isolator light source, but the means could alternatively comprise a capacitor, for example. The terminal block may for example be a retrofit terminal block for an existing field device.

According to a fourth aspect of the present invention, there is provided a method for connecting an external device to a field device, which field device is adapted to determine a process parameter value related to a tank and comprises a housing having an opening closed by a removable cover and field device electronics located in the housing, which method comprises: providing a terminal block in the housing, wherein the terminal block comprises: a first interface configured to connect to two wires of a loop for power supply to and signal output from the field device; a first electrical conductor and a second electrical conductor for connecting the first interface with the field device electronics, the second electrical conductor having a voltage drop generating element; a first power supply conductor connected to said second electrical conductor upstream of the voltage drop generating element and a second power supply conductor connected to said second electrical conductor downstream of the voltage drop generating element; and a second, auxiliary interface adapted for wired connection to the external device and configured at least for communication with said external device, wherein the second auxiliary interface comprises a communications connector which is galvanically isolated from the field device electronics; and connecting the external device to the second, auxiliary interface of the terminal block. This aspect may exhibit the same or similar feature and technical effects as any of the first to third aspects of the present invention, and vice versa.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

In this description, the present invention is mainly discussed in the context of radar level gauging for determining a tank filling level, but other implementations are possible as well.

Figure 1:
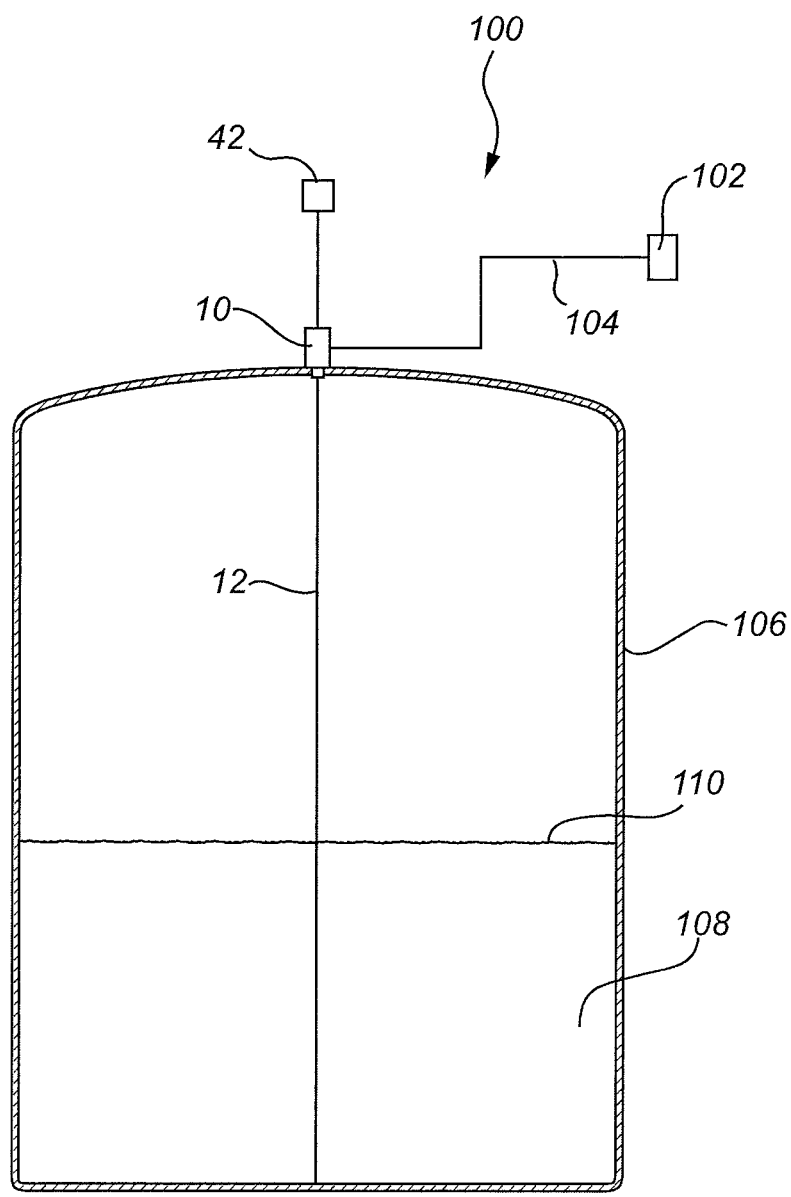
FIG. 1 is a schematic side view of a tank gauging system including a field device according to an embodiment of the present invention.

FIG. 1 shows a tank gauging system 100. The tank gauging system 100 comprises a field device 10, a power supply 102, and a process control loop 104.

The field device 10 is generally adapted to determine a process parameter value related to tank 106. The field device 10 in FIG. 1 is a radar level gauge specifically adapted to determine a filling level of a product 108 contained in the tank 106. Field device 10 may be mounted at the top of the tank 104. The field device 10 further comprises a propagation device, here in the form of a transmission line probe 12. Alternatively, the propagation device could be a radiating antenna (not shown).

The field device 10 is connected via the process control loop 104 to the power supply 102. The process control loop 104 comprises two wires 108a-b (see FIGS. 2b-c). The process control loop 104 may for example be a 4-20 mA loop, a loop in accordance with the HART standard, or a loop in accordance with the Fieldbus standard. The power supply 102 may for example form part of a control room. The process control loop 104 generally serves to supply power to, and signal output from, the field device 10. Data may also be sent via the loop 104 to the field device 10.

Figure 2A:
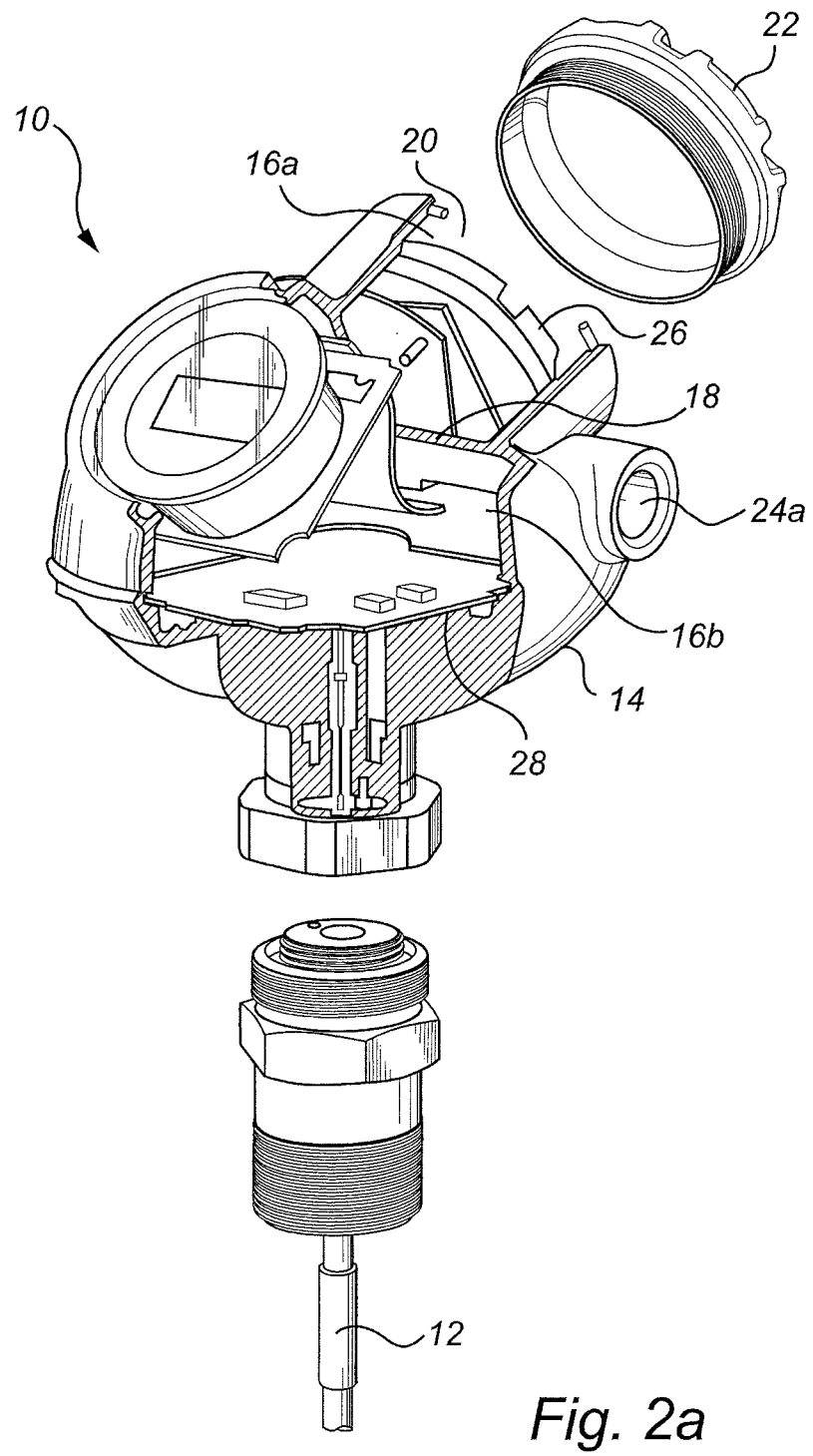
FIG. 2a is an exploded perspective view of the field device of FIG. 1.
Figure 2B:
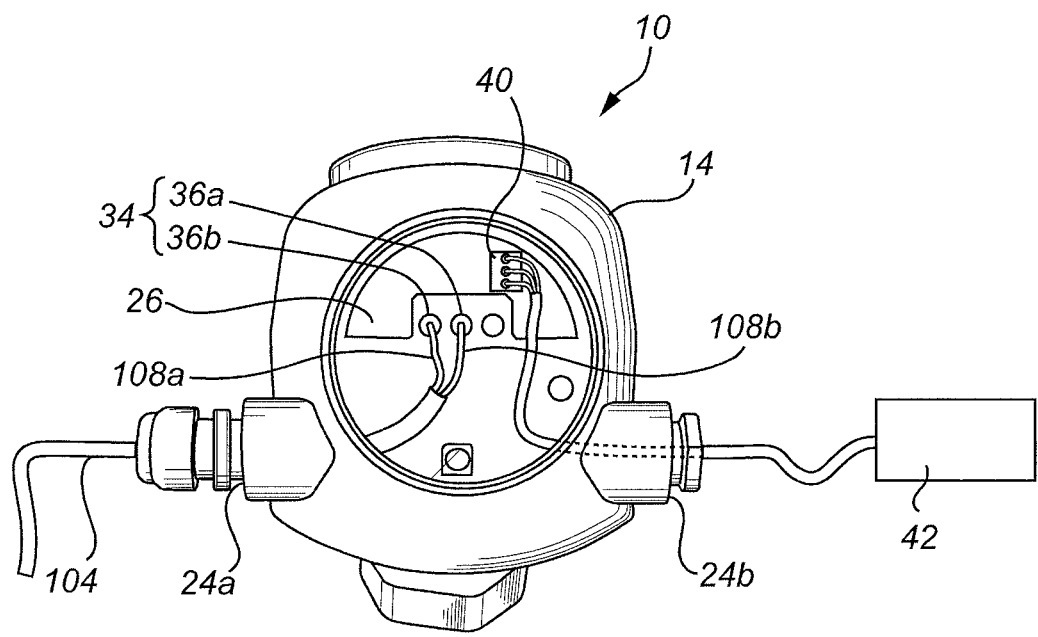
FIG. 2b is a top view of the field device of FIG. 1.
Figure 2C:
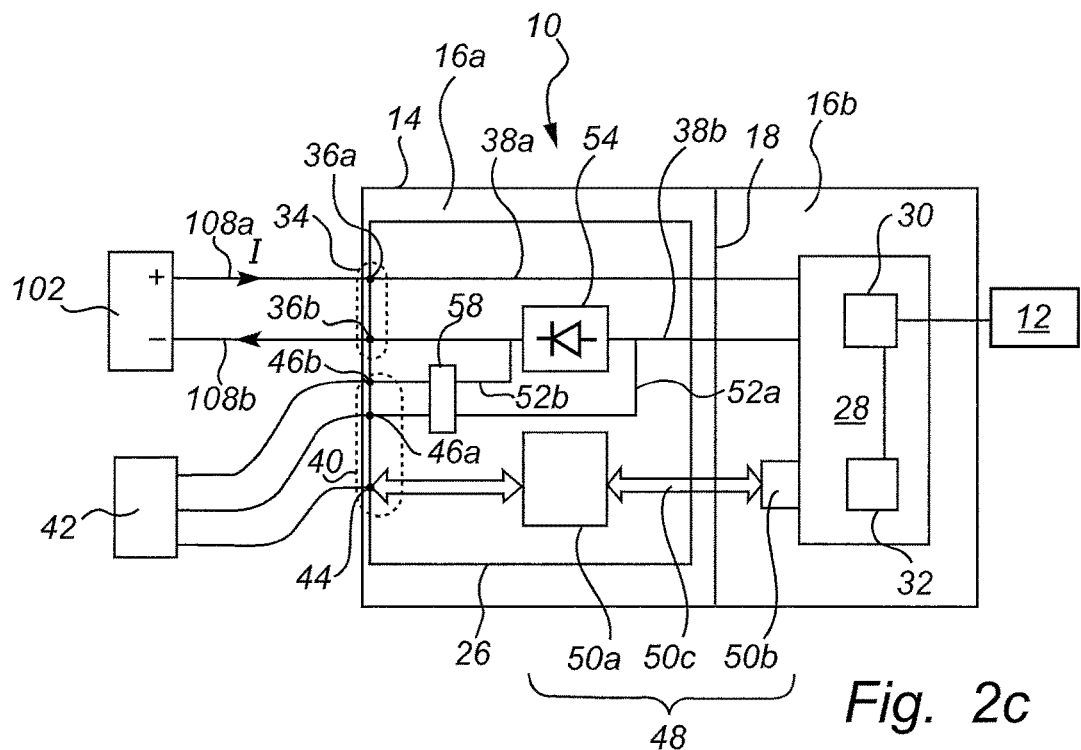
FIG. 2c schematically illustrates the field device of FIG. 1 comprising a terminal block according to a first embodiment of the present invention.

With further reference to FIGS. 2a-c, the field device 10 comprises a housing 14. The housing 14 may be flame or explosion proof. The housing 14 may comprise a first "dirty" compartment 16a, and a second "clean" compartment 16b. The first compartment 16a may also be referred to as a terminal compartment. The first and second compartments 16a-b may be separated by a physical barrier 18. In conjunction with the first compartment 16a, the housing comprises an opening 20, though with the first compartment 16a, but not the second compartment 16b, can be accessed. The opening 20 may be closed by a removable cover (or lid) 22. The housing 12 may further comprise two cable entries 24a-b. The wires 108a-b of process control loop 104 passes through cable entry 24a into the first compartment 16a.

The field device 10 further comprises a terminal block 26. The terminal block 26 is located in the first compartment 16a of the housing 14. The terminal block 26 can be accessed, for example by an operator, via the opening 20.

The field device 10 further comprises field device electronics 28. The field device electronics 28 are generally the complete electronics required to determine the filling level. The field device electronics 28 are located in the second compartment 16b of the housing. In the present radar level gauge implementation, the field device electronics 28 may comprise a transceiver 30 connected to the probe 12 and adapted to generate, transmit and receive electromagnetic signals, namely microwaves. The probe 12 is in turn arranged to propagate a transmitted electromagnetic signal towards the product 108 inside the tank 106, and to return a surface echo signal resulting from reflection of the transmitted electromagnetic signal at a surface 110 of the product 108 back to said transceiver 30. The field device electronics 28 also comprises processing circuitry 32 connected to the transceiver 30, which processing circuitry 32 is configured to determine the filling level based on the surface echo signal.

Like in a conventional field device, the terminal block 26 comprises an interface 34 connected to the wires 108a-b of the process control loop 104. To this end, the interface 34 may comprise two electrical connectors 36a-b, such as screw terminals. The interface 34 is here denoted a first interface 34.

A first electrical conductor 38a of the terminal block 26 is connected to one 36a of the electrical connectors and a second electrical conductor 38b of the terminal block 26 is connected to the other electrical connector 36b, for electrical connection to the field device electronics 28. In FIG. 2c, connector 36a and electrical conductor 38a are connected to the positive pole of the power supply 102, whereas connector 36b and electrical conductor 38b are connected to the negative pole of the power supply 102.

In accordance with the present invention, the terminal block 26 further comprises a second, auxiliary interface 40. The second auxiliary interface 40 is adapted for wired connection to an external device 42, such as a remote display or a pressure transducer. The device 42 is external to the field device 10. The device 42 may be an auxiliary device, in that it may support or be secondary to the main function of the field device 10, in this case filling level determination. The external device 42 may be connected to the second auxiliary interface 40 via a cable passing through cable entry 24b. In a first embodiment, the second auxiliary interface 40 is configured to both communicate with, and supply power to, the external device 42. To this end, the second auxiliary interface 40 comprises a communications connector 44 as well as first and second power supply connectors 46a-b. The connectors 44 and 46a-b may be electrical connectors, such as screw terminals. The second auxiliary interface 40 may be proprietary or standardized.

The communications connector 44 is in communication with, but galvanically isolated from, the field device electronics 28. To this end, the field device 10 may further comprise an opto-isolator 48. The opto-isolator 48 is connected between the communications connector 44 and the field device electronics 28. The opto-isolator 48 comprise a light source 50a on the terminal block 14 in the first compartment 16a and a photodetector 50b in the second compartment 16b. The light source 50a and the photodetector 50b are interconnected by an optical fibre 50c.

The first and second power supply connectors 46a-b are connected to the aforementioned second electrical conductor 38b via first and second power supply conductors 52a-b. In particular, the first power supply conductor 52a is connected to the second electrical conductor 38b upstream of a voltage drop generating element 54 of the second electrical conductor 36b, and the second power supply conductor 52b is connected to the second electrical conductor 38b downstream of the voltage drop generating element 54. The voltage drop generating element 54 is provided on or in the terminal block 26.

In the embodiment illustrated in FIG. 2c, the second electrical conductor 38b with the voltage drop generating element 54 is connected to the "return" wire 108b, which in turn is connected to the negative pole of power supply 102. Alternatively, the wire 108b and second electrical conductor 38b could be connected to the positive pole of the power supply 102, which means that voltage may be tapped from the input side.

The voltage drop generating element 54 may for example be a diode. The first power supply conductor 52a is connected at the anode side of the diode, whereas the second power supply conductor 52b is connected at the cathode side of the diode. The voltage drop of the diode may be in the order to 0.7 V. To increase the voltage drop, several diodes may be connected in series between the first and second power supply conductors 52a-b.

An ex-ia barrier 58 may optionally be provided between the second conductor 38b and the power supply connectors 46a-b as illustrated in FIG. 2c, whereby the second auxiliary interface 40 may be ex-ia regardless of input of the process control loop 104.

In operation, current I is supplied via the loop 104 from the power supply 102 to the field device 10, and the determined filling level is communicated from the field device 10 also via the loop 104, as is customary in the art. Furthermore, when the external device 42 is connected to the second auxiliary interface 40 and current is flowing in the second electrical conductor 38b, the voltage drop generating element 54 provides a small voltage drop, resulting in a lift-off voltage powering the external device 42. The voltage drop is equal to the forward voltage of the diode of the voltage drop generating element 54, e.g. 0.7 V. Given that the current is 4 mA, the power 0.7 V×4 mA=2.8 mW may be enough to power for example a display (external device 42).

Any data generated by the external device 42 is communicated via the communications connector 44 and the opto-isolator 48 to the field device electronics 28. In case the external device 42 is a pressure transducer, pressure data supplied from the pressure transducer can for example be used by the field device electronics 28 to more accurately determine the filling level. Data may also be communicated via the communications connector 44 to the external device 42, for example in case the external device 42 is a display or a Bluetooth chip.

When no external device 42 is connected to the second auxiliary interface 40, the power supply connectors 46a-b may be short-circuited, for example by means of a jumper (not shown). Alternatively, terminals to disable the second auxiliary interface 40 may be added.

Figure 3:
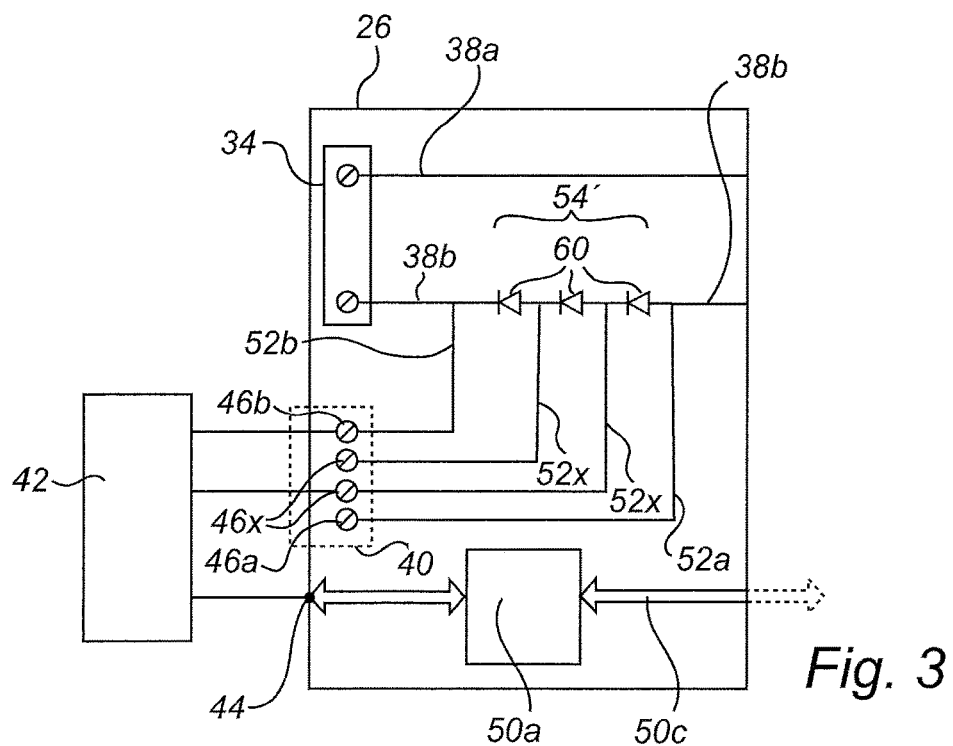
FIG. 3 schematically illustrates a variant of the terminal block in FIG. 2c.

FIG. 3 schematically illustrates a terminal block 26 according to a variant of the terminal block in FIG. 2c. The terminal block 26 in FIG. 3 may be similar to the terminal block in FIG. 2c, except that the voltage drop generating element is a configurable voltage drop generating element 54'. The configurable voltage drop generating element 54' comprises a plurality of diodes 60 connected in series. Each node between the diodes 60 is available as an additional power supply connector 46x on the second auxiliary interface 40, via additional (intermediate) power supply conductors 52x. In this way, a desired total voltage drop may be selected by connecting a particular external device 42 to the appropriate power supply connectors 46. If each diode 60 has a voltage drop of 0.7 V, and the external device 42 is connected as shown in FIG. 4, the total voltage drop is 1.4 V.

Figure 4:
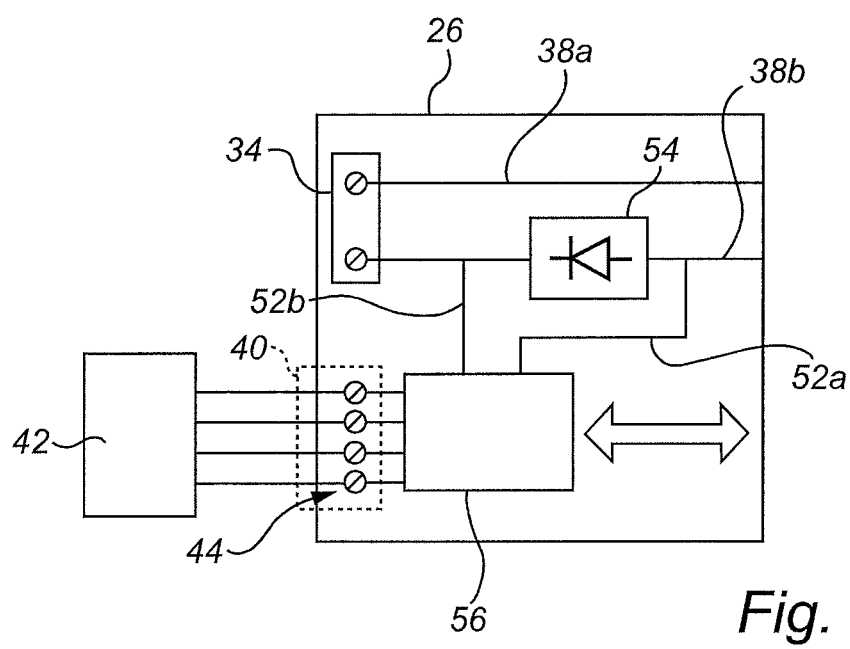
FIG. 4 schematically illustrates a terminal block according to a second embodiment of the present invention.

FIG. 4 schematically illustrates a terminal block 26 according to a second embodiment of the present invention. The terminal block in FIG. 4 is similar to the terminal block in FIG. 2c, but is does not comprise the power supply connectors 46a-b. Instead, the terminal block 26 in FIG. 3 comprises sensor electronics 56, which are connected to the first and second power supply conductors 52a-b. The sensor electronics 56 are also connected to the communications connector 44 of the second auxiliary interface 40. The communications connector 44 may here for example be a four wire RTD interface, which may receive communication in the form of analog signals, and the external device 42 may be a resistance temperature detector (RTD). The sensor electronics 56 is configured to determine an auxiliary process parameter value. The sensor electronics 56 may for example convert temperature signals from the RTD to digital SPI (serial peripheral interface) signals. The sensor electronics 56 are further connected to the field device electronics 28 via for example the aforementioned opto-isolator 48 (not shown in FIG. 4), so that the communications connector 44 in effect is galvanically isolated from the field device electronics 28.

In operation, when the external device 42 is connected to the second auxiliary interface 40 of the terminal block 26 of FIG. 4 and current is flowing in the second electrical conductor 38b, the voltage drop generating element 54 provides a small voltage drop, resulting in a lift-off voltage powering the sensor electronics 56. Signals generated by the external device 42 is communicated via the communications connector 44 to the field device electronics 28. In case the external device 42 is an RTD, temperature signals therefrom converted to digital SPI signals can for example be used by the field device electronics 28 to more accurately determine the filling level. When no external device 42 is connected to the second auxiliary interface 40 in FIG. 4, the first and second power supply conductors 52a-b may be short-circuited, for example by using two additional connections (not shown), in order to "turn off" the voltage drop.

The person skilled in the art realizes that the present invention by no means is limited to the preferred embodiments described above. On the contrary, many modifications and variations are possible within the scope of the appended claims.

What is claimed is:

1. A field device adapted to determine a process parameter value related to a tank, the field device comprising:
   a housing having an opening closed by a removable cover;
   a terminal block located in the housing and accessible via said opening; and
   field device electronics located in the housing,
   wherein the terminal block comprises:
   a first interface configured to connect to two wires of a loop for power supply to and signal output from the field device;
   a first electrical conductor and a second electrical conductor for connecting the first interface with the field device electronics, the second electrical conductor having a voltage drop generating element;
   a first power supply conductor connected to said second electrical conductor upstream of the voltage drop generating element and a second power supply conductor connected to said second electrical conductor downstream of the voltage drop generating element; and
   a second, auxiliary interface adapted for wired connection to an external device and configured at least for communication with said external device, wherein the second auxiliary interface comprises a communications connector which is galvanically isolated from the field device electronics.

2. A field device according to claim 1, wherein the second auxiliary interface is further configured to power the external device using a lift-off voltage taken from the loop.

3. A field device according to claim 1, wherein the second auxiliary interface further comprises first and second power supply connectors, the first power supply connector being connected to said first power supply conductor and the second power supply connector being connected to said second power supply conductor.

4. A field device according to claim 3, wherein the terminal block further comprises an intrinsic safety barrier between said second electrical conductor and the power supply connectors of the second auxiliary interface.

5. A field device according to claim 1, wherein the terminal block further comprises sensor electronics connected to the communications connector of the second auxiliary interface and to said first and second power supply conductors, and wherein the sensor electronics are configured to determine an auxiliary process parameter value.

6. A field device according to claim 5, wherein the sensor electronics are adapted to convert signals from the external device connected to the communications connector of the second auxiliary interface to digital signals.

7. A field device according to claim 1, wherein the voltage drop generating element comprises at least one diode.

8. A field device according to claim 1, wherein the voltage drop generating element is a configurable voltage drop generating element.

9. A field device according to claim 1, wherein the housing comprises a first compartment accommodating the terminal block, and a second compartment accommodating the field device electronics.

10. A field device according to claim 1, further comprising an opto-isolator connected between the communications connector and the field device electronics.

11. A field device according to claims 9 and 10, wherein the opto-isolator comprises a light source on the terminal block and a photodetector in the second compartment, and wherein the light source and the photodetector are interconnected by an optical fibre.

12. A field device according to claim 1, wherein the field device is a radar level gauge adapted to determine a filling level of a product contained in the tank, wherein the radar level gauge further comprises a propagation device, and wherein the field device electronics include:
    a transceiver connected to the propagation device and adapted to generate, transmit and receive electromagnetic signals, wherein the propagation device is arranged to propagate a transmitted electromagnetic signal towards said product inside the tank, and to return a surface echo signal resulting from reflection of the transmitted electromagnetic signal at a surface of the product contained in the tank back to said transceiver; and
    processing circuitry connected to the transceiver and configured to determine said filling level based on said surface echo signal.

13. A tank gauging system, comprising:
    a field device adapted to determine a process parameter value related to a tank;
    a power supply;
    a process control loop comprising two wires connected to the power supply; and
    an external device,
    wherein the field device comprises a housing having an opening closed by a removable cover, a terminal block located in the housing and accessible via said opening, and field device electronics located in the housing, the terminal block comprising:

a first interface to which the two wires are connected for power supply to and signal output from the field device;

a first electrical conductor and a second electrical conductor for connecting the first interface with the field device electronics, the second electrical conductor having a voltage drop generating element;

a first power supply conductor connected to said second electrical conductor upstream of the voltage drop generating element and a second power supply conductor connected to said second electrical conductor downstream of the voltage drop generating element; and a second, auxiliary interface to which the external device is connected, wherein the second auxiliary interface is configured at least for communication with said external device, and wherein the second auxiliary interface comprises a communications connector which is galvanically isolated from the field device electronics.

14. A terminal block for a field device adapted to determine a process parameter value related to a tank, wherein the terminal block comprises:

a first interface configured to connect to two wires of a loop for power supply to and signal output from the field device;

a first electrical conductor and a second electrical conductor for connecting the first interface to field device electronics of the field device, the second electrical conductor having a voltage drop generating element;

a first power supply conductor connected to said second electrical conductor upstream of the voltage drop generating element and a second power supply conductor connected to said second electrical conductor downstream of the voltage drop generating element; and a second, auxiliary interface adapted for wired connection to an external device and configured at least for communication with said external device, wherein the second auxiliary interface comprises a communications connector;

wherein the communications connector is galvanically isolated from the field device electronics.

15. A method for connecting an external device to a field device, which field device is adapted to determine a process parameter value related to a tank and comprises a housing having an opening closed by a removable cover and field device electronics located in the housing, which method comprises:

providing a terminal block in the housing, wherein the terminal block comprises: a first interface configured to connect to two wires of a loop for power supply to and signal output from the field device; a first electrical conductor and a second electrical conductor for connecting the first interface with the field device electronics, the second electrical conductor having a voltage drop generating element; a first power supply conductor connected to said second electrical conductor upstream of the voltage drop generating element and a second power supply conductor connected to said second electrical conductor downstream of the voltage drop generating element; and a second, auxiliary interface adapted for wired connection to the external device and configured at least for communication with said external device, wherein the second auxiliary interface comprises a communications connector which is galvanically isolated from the field device electronics; and connecting the external device to the second, auxiliary interface of the terminal block.

* * * * *